United States Patent
Tsuchida et al.

(10) Patent No.: US 7,403,518 B2
(45) Date of Patent: Jul. 22, 2008

(54) PACKET TRANSMISSION SYSTEM, PACKET TRANSMISSION METHOD, PACKET TRANSMISSION PROGRAM, AND RECORDING MEDIUM ON WHICH THE RECORDED PROGRAM IS RECORDED

(75) Inventors: Mitsuru Tsuchida, Tokyo (JP); Yoshihiro Asashiba, Tokyo (JP); Ryusuke Kawate, Tokyo (JP); Eiichi Horiuchi, Tokyo (JP); Hiroaki Mukai, Tokyo (JP); Michiya Takemoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 801 days.

(21) Appl. No.: 10/482,209

(22) PCT Filed: Mar. 18, 2002

(86) PCT No.: PCT/JP02/02521

§ 371 (c)(1),
(2), (4) Date: Dec. 29, 2003

(87) PCT Pub. No.: WO03/003663

PCT Pub. Date: Jan. 9, 2003

(65) Prior Publication Data
US 2004/0196869 A1 Oct. 7, 2004

(30) Foreign Application Priority Data
Jun. 29, 2001 (JP) .............................. 2001-197671

(51) Int. Cl.
*H04L 12/56* (2006.01)
(52) U.S. Cl. ...................... 370/389; 370/392

(58) Field of Classification Search ................ 370/464, 370/445, 447, 450, 454, 459, 461, 462, 471, 370/431, 442, 443, 444, 458, 389, 392, 373, 370/377, 360, 426, 428, 411, 398
See application file for complete search history.

(56) References Cited

U.S. PATENT DOCUMENTS

| 5,440,555 | A  | * | 8/1995  | Momona ..................... 370/455 |
| 6,078,572 | A  | * | 6/2000  | Tanno et al. ................. 370/335 |
| 6,091,717 | A  | * | 7/2000  | Honkasalo et al. .......... 370/329 |
| 6,236,646 | B1 | * | 5/2001  | Beming et al. .............. 370/335 |
| 6,351,459 | B1 | * | 2/2002  | Kondo ......................... 370/330 |
| 6,424,818 | B1 | * | 7/2002  | Hirono ...................... 455/11.1 |
| 6,496,499 | B1 | * | 12/2002 | Hamilton et al. ............. 370/348 |
| 7,103,012 | B2 | * | 9/2006  | Suda .......................... 370/282 |

FOREIGN PATENT DOCUMENTS

| EP | 0 877 512 A2 | * | 11/1998 |
| EP | 1 017 244    |   | 7/2000  |

(Continued)

*Primary Examiner*—Brenda Pham
(74) *Attorney, Agent, or Firm*—Oblon, Spivak, McClelland, Maier & Neustadt, P.C.

(57) ABSTRACT

An OLT 1 sequentially allocates transmission permission of a packet on an upstream transmission line to a plurality of ONUs 2 registered, and performs packet communication in a simplified method with control by using a first timer for detecting a packet signal and a second timer for controlling transmission permission time, in order to transmit an IP packet of variable length without mounting a function of complex processing for analyzing an upstream packet in the OLT 1.

10 Claims, 12 Drawing Sheets

FOREIGN PATENT DOCUMENTS

| | | |
|---|---|---|
| JP | 64-055748 | 4/1989 |
| JP | 64-55748 | 4/1989 |
| JP | 04-100441 | 4/1992 |
| JP | 4-100441 | 4/1992 |
| JP | 5-160873 | 6/1993 |
| JP | 09-153858 | 6/1997 |
| JP | 10-200564 | 7/1998 |
| JP | 10-262074 | 9/1998 |
| JP | 10-290233 | 10/1998 |
| JP | 11-098151 | 4/1999 |
| JP | 11-205348 | 7/1999 |
| WO | WO 97/35410 | 9/1997 |
| WO | WO 01/93498 | 12/2001 |

\* cited by examiner

PACKET TRANSMISSION SYSTEM, PACKET TRANSMISSION METHOD, PACKET TRANSMISSION PROGRAM, AND RECORDING MEDIUM ON WHICH THE RECORDED PROGRAM IS RECORDED

TECHNICAL FIELD

This invention relates to a packet communication system and its method for communicating IP (INTERNET PROTOCOL) packet data of variable length to a user network interface (UNI: USER NETWORK INTERFACE).

BACKGROUND ART

As an example of related art, FIG. 12 shows a block chart for explaining a system configuration of an optical communication apparatus and its communication method and a recording medium in which its control method is described in Japanese Unexamined Published Patent Publication HEI 11-98151 for example.

In FIG. 12, the optical communication apparatus includes a station equipment 111 and a subscriber's equipment 113. An external workstation 112 is connected to the station equipment 111, and a terminal 114 is connected to the subscriber's equipment 113.

The station equipment 111 includes a function of allowing changing bands dynamically. In a PON system, an excess band between the subscriber's equipment 113 and the station equipment 111 excluding band assurance service is shared among a plurality of subscribers subscribing to band non-assurance type service by using the function of the station equipment 111.

The subscriber's equipment 113 includes a PDS (Passive Double Star) terminating unit 131 for terminating an interface with the station equipment 111 facing to the subscriber's equipment 113, a terminal interface terminating unit 133 for terminating the band non-assurance type service in a user side, a memory 132 for performing format conversion between the PDS terminating unit 131 and the terminal interface terminating unit 133 and storing packet data, and a memory control unit 134 for measuring data accumulation volume in the memory 132 and notifying the PDS terminating unit 131 of transmission request when a signal is needed to be sent to the station equipment 111 side by opening the PDS terminating unit 131.

The station equipment 111 includes a PDS terminating unit 121 for terminating an interface with the subscriber's equipment 113 facing to the station equipment 111, a control unit 125 for terminating control information from the external workstation 112 and distributing necessary control information to each of function blocks in the equipment, a subscriber's information accumulating unit 124 for accumulating information on a subscriber who has applied to use a shard band in the control information from the control unit 125, a packet analyzing unit 123 for receiving subscriber's information from the subscriber's information accumulating unit 124 and sending a subscriber's ID and a polling instruction to the PDS terminating unit 121 and a time-division switch (TSW: TIME DIVISION SWITCH) 122.

When the packet analyzing unit 123 has transmitted the subscriber's ID and the polling instruction to the PDS terminating unit 121, the packet analyzing unit 123 receives transmission request 151 and a subscriber's ID from the relevant subscriber's station 113. When the packet analyzing unit 123 has received the transmission request, the packet analyzing unit 123 sends the relevant subscriber's equipment 113 a transmission permission signal 152 for upstream shared queuing which is shared by using the above-stated function, and receives a packet signal from the subscriber's equipment 113. Further, the packet analyzing unit 123 analyzes a packet length signal described in a packet overhead (LLC part) in a first packet signal from the subscriber's equipment 113, determines time of occupancy by the relevant subscriber's equipment based on packet length, sends the transmission permission signal 152 to the subscriber's equipment 113 only for the time of occupancy, and receives the packet signal from the subscriber's equipment 113.

As stated, the above-stated related art has adopted a method that when an OLT (OPTICAL LINE TERMINATION) as the station equipment 111 allocates a transmission band for an upstream direction to ONUs (OPTICAL NETWORK UNIT) which are a plurality of subscriber's equipments 113, the OLT sends subscriber's ID information and polling instruction information to an arbitrary ONU and receives transmission request information and the subscriber's ID information from the relevant subscriber's equipment 113, and further when the OLT has received the transmission request information, the OLT sends a transmission permission signal to the relevant subscriber's equipment 113 and receives the packet signal from the relevant subscriber's equipment 113. Further, the packet analyzing unit in the OLT has adopted a method of analyzing the packet length signal described in the packet overhead (LLC part) in the first packet signal from the subscriber's equipment 113, determining the time of occupancy by the relevant subscriber's equipment 113 based on the packet length, sending the transmission permission signal to the subscriber's equipment 113 only for the time of occupancy, and receiving the packet signal from the relevant subscriber's equipment 113. Therefore, it has been necessary that the OLT has complex function of controlling processing and function of analyzing a packet.

This invention aims at performing packet communication in a simplified sending and receiving method by sequentially allocating transmission permission of a packet on an upstream transmission line by the OLT to the plurality of ONUs registered.

DISCLOSURE OF THE INVENTION

For achieving the above-stated object, a packet communication system according to this invention includes a master station for transmitting a downstream packet signal including identification information for identifying transmission permission in order to give transmission permission without receiving transmission request to the master station itself, and a slave station for receiving the downstream packet signal transmitted from the above master station and judging if transmission has been permitted based on the identification information in the downstream packet signal received.

Further, the above slave station transmits an upstream packet signal to the master station when the slave station judges that transmission has been permitted.

Further, the above master station includes a timer 1 for detecting packet which measures limit time when the master station can judge if the upstream packet signal has been transmitted from the above slave station to which transmission has been permitted, and the master station judges if the master station has received the upstream packet signal transmitted from the above slave station within the limit time measured by the timer 1 for detecting packet, stops the timer

1 for detecting packet when the master station has received the upstream packet signal, and updates the identification information for identifying transmission permission when the master station has not received the upstream packet signal.

Further, the above master station includes a timer 2 for permitting transmission which measures limit time when the master station can continuously receive the upstream packet signal transmitted from the above slave station to which transmission has been permitted, and the master station judges if receipt of the upstream packet signal transmitted from the above slave station has ended within the limit time measured by the timer 2 for permitting transmission, stops the timer 2 for permitting transmission when the receipt has ended, and updates the identification information for identifying transmission permission when the receipt has not ended.

Further, the above master station transmits a downstream packet signal including overhead information indicating time when output of the upstream packet signal is unstable, and the above slave station adds an overhead which is a group of signals which are not reproduced by the above master station on a head of the upstream packet signal corresponding to the overhead information in the downstream packet signal transmitted from the above master station.

Further, the above master station includes a buffer for accumulating the downstream packet signal separately according to signal transmission speeds, and the master station reads out the downstream packet signal of various speeds accumulated in the buffer separately according to the signal transmission speeds, transmits the downstream packet signal of the various speeds read out, and permits a slave station which has been able to be synchronized with transmission speed of the downstream packet signal to transmit an upstream packet signal.

Further, the above master station monitors upstream packet communication volume of each slave station and controls a value of the timer 2 for permitting transmission for the above slave station based on the upstream packet communication volume.

Further, the above slave station informs the above master station of volume of the upstream packet signal to be accumulated in the buffer when transmission permission is given to the slave station, and the above master station controls a value of the timer 2 for permitting transmission for the above slave station based on upstream packet accumulation volume informed by the above slave station.

Further, the above slave station informs the above master station of ending information indicating that no user IP packet is to be transmitted if no upstream user IP packet is to be transmitted when transmission permission is given to the slave station, and the above master station receives the ending information from the above slave station, judges if communication has ended, and allocates transmission permission to a next slave station after the above slave station.

Further, when transmission permission is given to the above slave station and the above slave station has ended transmission of all of the user IP packets held, the above slave station informs the above master station of ending information indicating that no user IP packet is to be transmitted, and the above master station receives the ending information from the above slave station, judges if communication has ended, and allocates transmission permission to a next slave station after the above slave station.

Further, the above master station specifies volume of packet which can be transmitted continuously by the above slave station when the above master station gives transmission permission to the above slave station, and the above slave station ends processing of packet transmission based on the volume of packet which can be transmitted continuously, specified for specifying.

Further, in a packet communication method according to this invention, a master station transmits a downstream packet signal including identification information for identifying transmission permission, and a slave station receives the downstream packet signal transmitted from the above master station and judges if transmission has been permitted based on an identification number of the downstream packet signal received.

Further, a packet communication program according to this invention makes a computer execute processing that a master station transmits a downstream packet signal including identification information for identifying transmission permission by a master station and processing that a slave station receives the downstream packet signal transmitted from the above master station and judges if transmission has been permitted based on the identification number in the downstream packet signal received.

Further, in a computer-readable recording medium according to this invention, a packet communication program for making a computer execute processing that a master station transmits a downstream packet signal including identification information for identifying transmission permission and processing that the slave station receives the downstream packet signal transmitted from the above master station and judges if transmission has been permitted based on an identification number of the downstream packet signal received is stored.

BEST MODE FOR CARRYING OUT THE INVENTION

Embodiment 1

Embodiment 1 is explained below.

Figure 1:
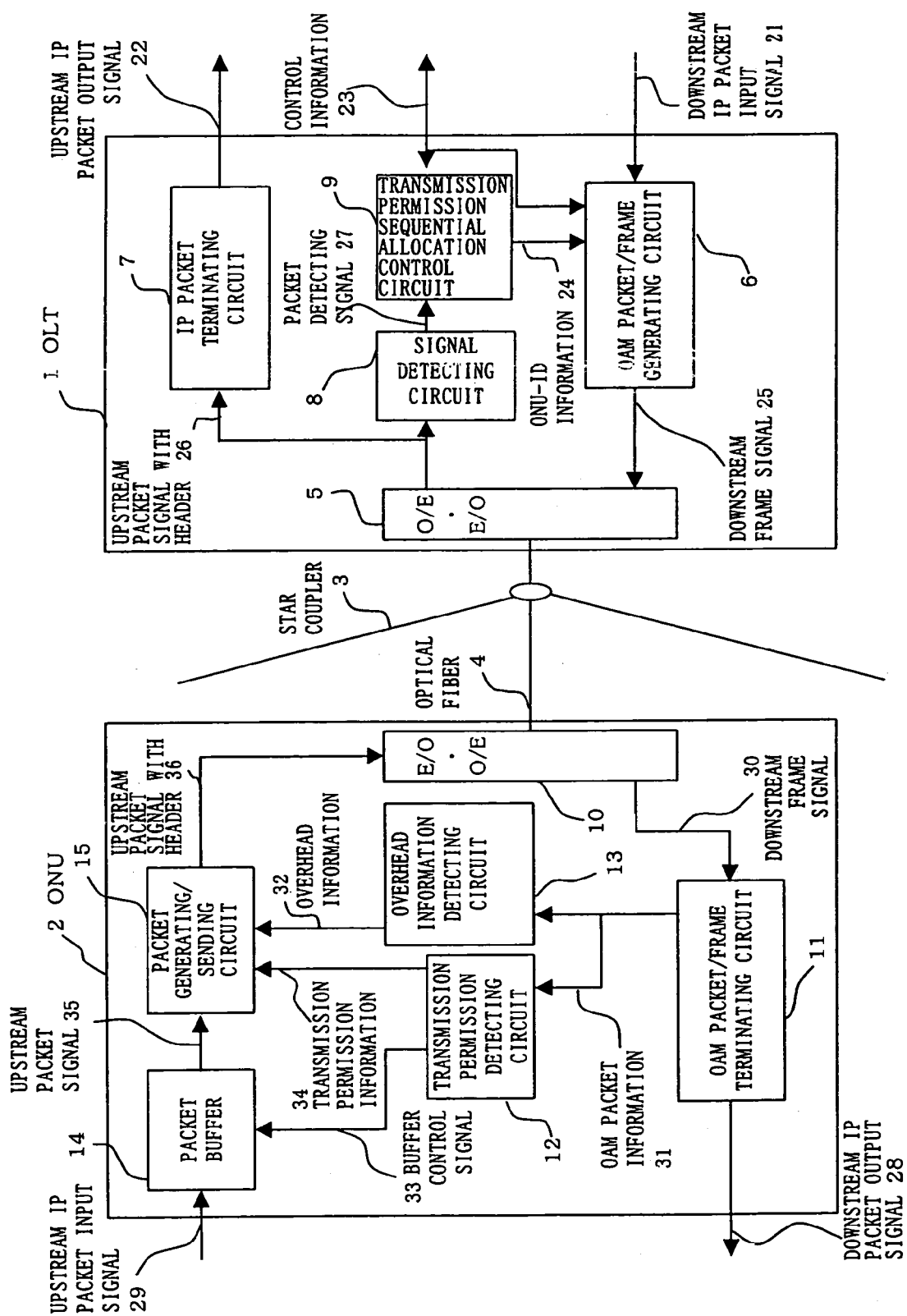
FIG. 1 is a functional configuration chart for explaining a PON system for an IP packet related to Embodiment 1 and 2.

FIG. 1 is a functional configuration chart of a PON (PASSIVE OPTICAL NETWORK) system for an IP packet for explaining an operation of this embodiment. Here, the PON system is a form of an optical subscriber network using a passive part such as a star coupler as a component of a network.

1 denotes an OLT (master station), 2 denotes an ONU (slave station), 3 denotes a star coupler for connecting the single OLT 1 and a plurality of ONUs 2 by an optical filer, and 4 denotes the optical fiber.

Figure 2:
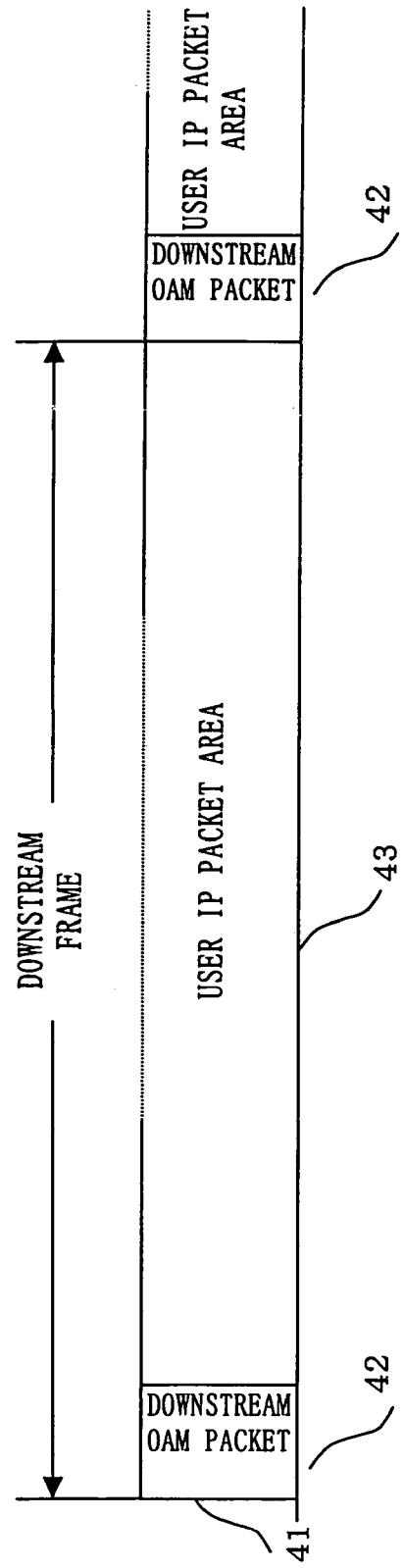
FIG. 2 is a configuration chart of a downstream frame signal for explaining the PON system for the IP packet related to Embodiment 1 and 2.

In the OLT 1, 5 denotes an E/O (ELECTRICAL/OPTICAL) circuit for converting an electrical signal into an optical signal and an O/E (OPTICAL/ELECTRICAL) circuit for converting the optical signal into the electrical signal. 6 denotes an OAM packet/frame generating circuit for generating a downstream frame signal transmitted from the OLT 1 to the ONU 2. As illustrated in FIG. 2, this downstream frame signal include's a downstream OAM (OPERATION AND MAINTENANCE) packet 42 and a user IP packet area 43. 7 denotes an IP packet terminating circuit for terminating an upstream packet signal from the ONU 2, 8 denotes a signal detecting circuit for detecting receipt of the upstream packet signal from the ONU 2, and 9 denotes a transmission permission sequential allocation control circuit for permitting an arbitrary ONU 2 to transmit the upstream packet signal. As stated later, in the PON system for the IP packet in this embodiment, the OLT 1 sequentially allocates transmission permission of the packet on an upstream transmission line to the plurality of ONUs 2 registered in advance mainly by using the transmission permission sequential allocation control circuit.

Figure 3:
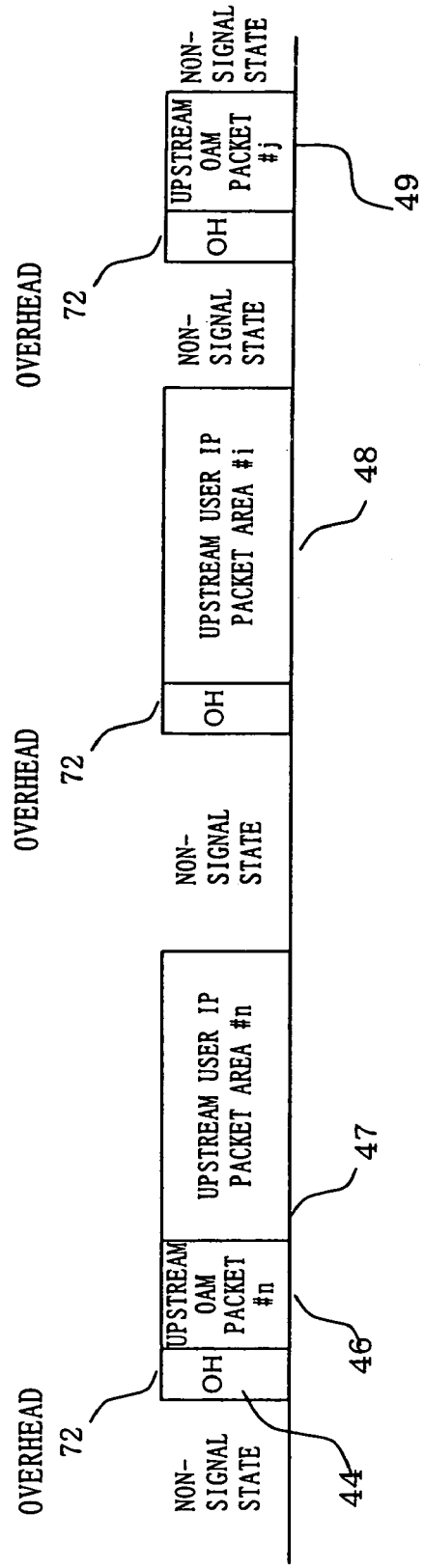
FIG. 3 is a configuration chart of an upstream packet signal for explaining the PON system for the IP packet related to Embodiment 1 and 2.
Figure 4:
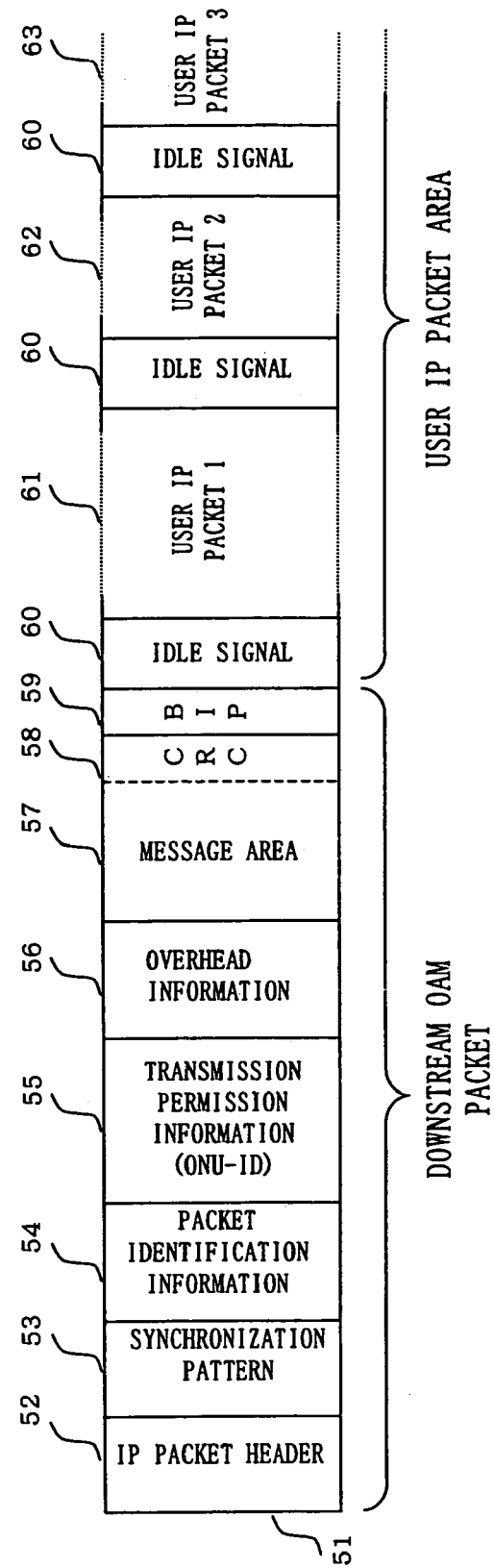
FIG. 4 is a configuration chart of the downstream frame signal for explaining a downstream frame in FIG. 2.

Next, in the ONU 2, 10 denotes an O/E•E/O circuit for converting the optical signal into the electrical signal and converting the electrical signal into the optical signal, and 11 denotes an OAM packet/frame terminating circuit for terminating the downstream frame signal. 12 denotes a transmission permission detecting circuit for comparing an identifier (ONU_ID) for specifying the ONU 2 set in a transmission permission information 55 area in the downstream OAM packet in the downstream frame signal illustrated in FIG. 4 and an identifier (ONU_ID) held by the ONU itself. The identifier specified in this downstream OAM packet has information on to which slave station the master station is giving transmission permission. 13 denotes an overhead information detecting circuit for detecting overhead information 56 in the downstream OAM packet in the downstream frame signal illustrated in FIG. 4. This overhead information 56 is to inform the ONU 2 of receiving performance of the OLT 1 itself, and indicates time until the OLT 1 becomes able to receive the upstream packet signal stably. Therefore, as illustrated in FIG. 3, the ONU 2 continues to attach a group of signals (overhead 72) which are substantially unnecessary and meaningless on a head of the upstream packet signal during the time indicated in the overhead information 56. 15 denotes a packet generating/sending circuit for generating an upstream packet signal with a header by attaching the overhead 72 to the upstream packet signal, as stated above.

Accordingly, the OLT 1 becomes able to receive the upstream packet signal stably as stated later. 14 denotes a packet-buffer for accumulating an upstream IP packet input signal 29 input from an outside of the ONU 2.

FIG. 2 shows a configuration chart for explaining a structure of the downstream frame signal transmitted from the OLT 1 to the ONU 2 in the PON system for the IP packet in this embodiment. In this explanation, a frame means one unit (packet) for transmitting information. In FIG. 2, 41 denotes a whole downstream frame signal (downstream packet signal) repeated cyclically, 42 denotes the downstream OAM packet indicating the head of the downstream frame signal, and 43 denotes the user IP packet area. Further, FIG. 3 is a configuration chart for explaining a structure of the upstream packet signal transmitted from the ONU 2 to the OLT 1. In FIG. 3, 44 denotes an example of configuration of the upstream packet signal. In FIG. 3, one example that the overhead 72, the upstream OAM packet 46 (#n) and an upstream user IP packet area 47 (#n) configure a single upstream packet signal, another example that the overhead 72 and an upstream user IP packet area 48 (#i) configure a single upstream packet signal, and the other example that the overhead 72 and an upstream OAM packet 49 (#j) configure a single upstream packet signal are illustrated. 46 denotes the upstream OAM packet (#n) which is one of components of the upstream packet signal transmitted from the ONU 2 (#n) which is the n-th ONU 2. 47 denotes the upstream user IP packet area (#n) which is a component of the upstream packet signal transmitted from the ONU 2 (#n) which is the n-th ONU 2. 48 denotes the upstream user IP packet area 48 (#i) which is a component of the upstream packet signal transmitted from the ONU 2 (#i) which is the i-th ONU 2. 49 denotes the upstream OAM packet 49 (#j) which is a component of the upstream packet signal transmitted from the ONU 2 (#j) which is the j-th ONU 2. In FIG. 3, an upstream packet signal area and a non-signal state are repeated. This is to make the plurality of ONUs 2 use the transmission line time-divisionally and prevent a single ONU 2 from occupying the transmission line for a long time by dividing the signal into packets.

FIG. 4 is a configuration chart showing details of the OAM packet and the user IP packet area illustrated in FIG. 2, configuring the downstream frame signal in the PON system for the IP packet in this embodiment.

51 denotes a downstream packet signal including the downstream OAM packet and the user IP packet area. The OAM packet of them includes the following components. Specifically, an IP packet header 52, a synchronous pattern 53, packet identification information 54, the transmission permission information 55 (ONU-ID), the overhead information 56, a message area 57, CRC 58 indicating a CRC (CYCLIC REDUNDANCY CHECK) operation result for the message area 57, and BIP (BITE INTERLEAVED PARITY) 59 information for applying to a period between a previous OAM packet and a present OAM packet are included. Further, the user IP packet area includes an idle signal 60 interpolated between the packet signals, a user IP packet 1 61, a user IP packet 2 62, a user IP packet 3 63, etc.

Figure 5:
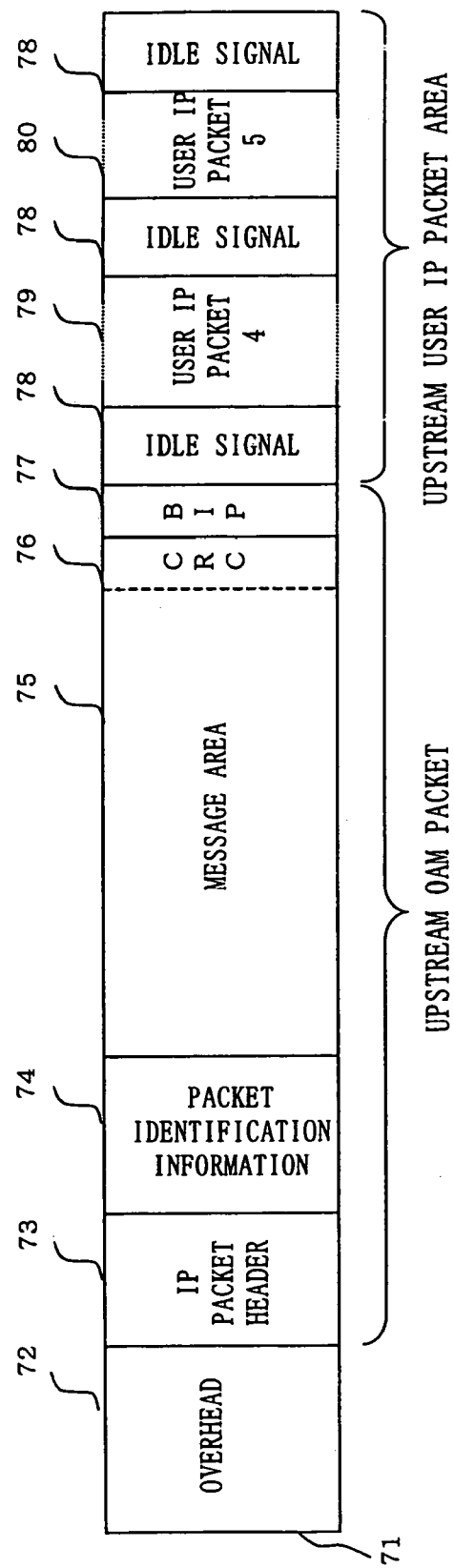
FIG. 5 is a configuration chart of the upstream packet signal for explaining an upstream packet in FIG. 3.

FIG. 5 shows a configuration chart showing details of the upstream OAM packet and the upstream user IP packet area illustrated in FIG. 3 in the PON system for the IP packet in this embodiment. 71 denotes an upstream packet signal including the upstream OAM packet and the upstream user IP packet area. 72 denotes the overhead attached to the head of the upstream packet signal. The upstream OAM packet configuring the upstream packet signal includes an IP packet header 73, packet identification information 74, a message area 75, CRC 76 indicating a CRC operation result for the message area, and BIP 77 for applying to a period between a previous OAM packet and a present OAM packet. Further, the upstream user IP packet area includes an idle signal 78 interpolated between the packet signals, a user IP packet 4 79, a user IP packet 5 80, etc.

Figure 6:
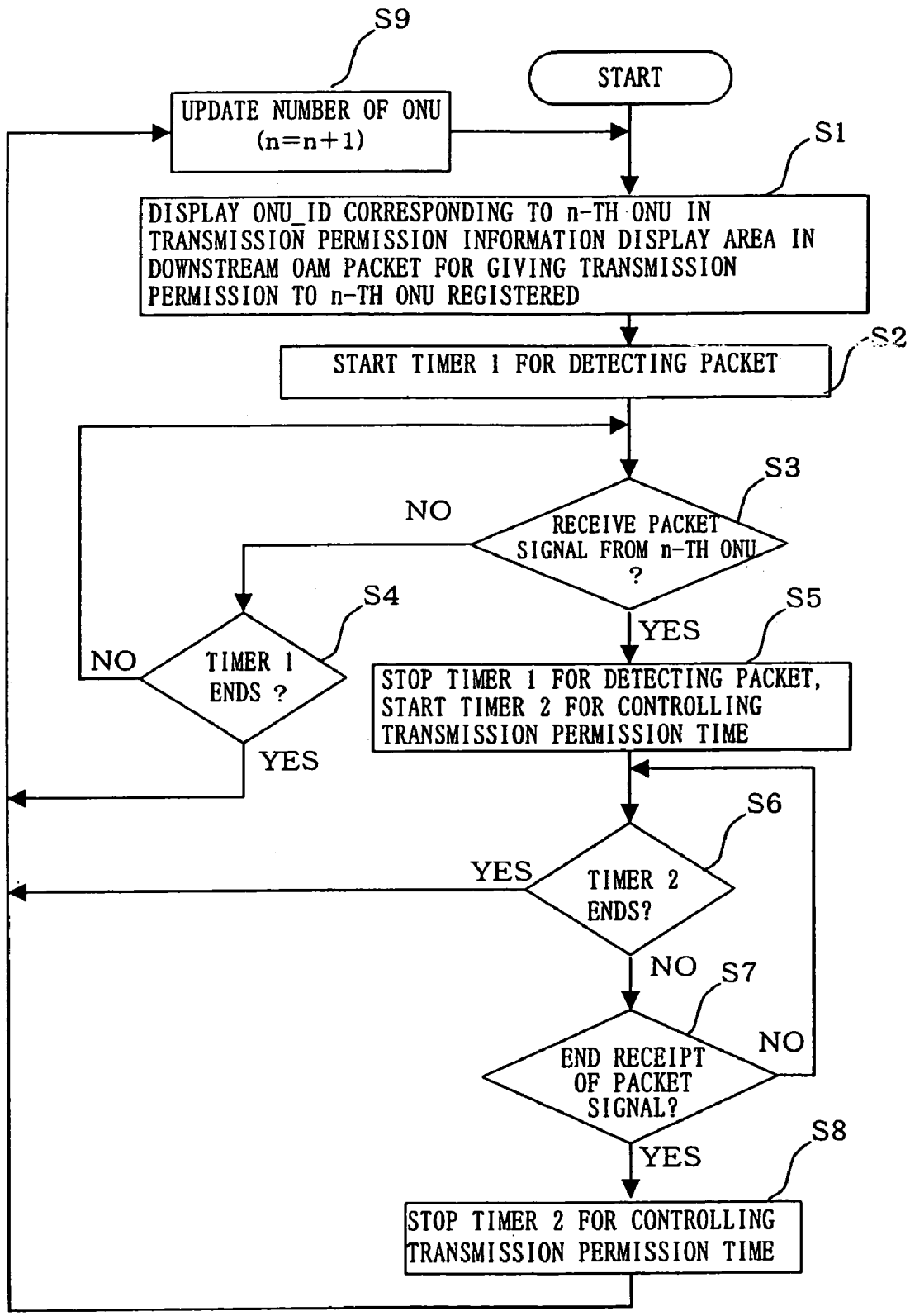
FIG. 6 is a flow chart concerning allocation algorithm for setting transmission permission to explain the PON system for the IP packet related to Embodiment 1.

FIG. 6 shows a flow chart concerning allocation algorithm for setting transmission permission to the plurality of ONUs 2 by the OLT 1 in this embodiment.

S1

S1 is a step of displaying the ONU identifier (ONU_ID) corresponding to the n-th ONU 2 as identification information in the transmission permission information 55 area in the downstream OAM packet illustrated in FIG. 4 for OLT 1 to give transmission permission to the n-th ONU 2 registered in advance.

S2

S2 is a step of starting a timer 1 for detecting packet, which is the first timer, in consequence of the above step 1 (S1) of displaying the ONU identifier (ONU_ID) corresponding to the n-th ONU 2 in the transmission permission information 55 area in the downstream OAM packet. The timer 1 for detecting packet is provided for judging if the OLT 1 can receive (detect) the upstream packet signal transmitted from the n-th ONU 2 to which the OLT 1 has given transmission permission within limit time set by the OLT 1 in the timer 1 for detecting packet. This timer 1 for detecting packet is managed by the OLT 1.

S3

S3 is a step of judging if the OLT 1 has received the upstream packet signal transmitted from the n-th ONU 2 to which the OLT 1 gave transmission permission. Specifically, the OLT 1 judges if the OLT 1 has received the upstream packet signal transmitted from the n-th ONU 2 to which the OLT 1 itself gave transmission permission, based on the packet identification information 74 in the upstream packet signal received, which is illustrated in FIG. 5. The OLT 1 always monitors receipt of the upstream packet signal by receiving the upstream packet signal from the n-th ONU 2 within the limit time measured by the timer 1 for detecting packet or repeating this operation until the limit time measured by the timer 1 for detecting packet expires.

S4

S4 is a step of judging if the timer 1 for detecting packet started in step 2 (S2) has expired. As stated above, when the OLT 1 has not received the upstream packet signal transmitted from the n-th ONU 2 which the OLT 1 has permitted to transmit, in this step, the OLT judges if the limit time measured by the timer 1 for detecting packet has expired. When the limit time has not expired, processing goes back to step 3 (S3). When the limit time has expired, in step 9 (S9), the ONU identifier (ONU_ID) is updated for permitting another ONU 2 to transmit (S9). In FIG. 6, one is added to a value of n, however an updating method is not limited to this method. For example, it is also possible to give transmission permission to the plurality of ONUs 2 uniformly in a focusing or descending order. It is also possible to give priority to a certain ONU 2 in giving transmission permission.

S5

S5 is a step of stopping the timer 1 for detecting packet and starting the timer 2 for controlling transmission permission time (transmission permission timer) which is the second timer, when the OLT has received the upstream packet signal from the n-th ONU 2 to which the OLT 1 gave transmission permission. As illustrated in FIG. 3, the timer 2 for controlling transmission permission time is provided for judging if the OLT 1 can receive all of the upstream packet signals transmitted from the n-th ONU 2 within the limit time measured by the timer 2 for controlling transmission permission time. This timer 2 for controlling transmission permission time is managed by the OLT 1.

S6

S6 is a step of judging if the limit time measured by the timer 2 for controlling transmission permission time started in step 5 (S5) has expired. When the limit time measured by the timer 2 for controlling transmission permission time has expired, in step 9 (S9), the ONU identifier (ONU_ID) is updated for permitting another ONU 2 to transmit.

S7

S7 is a step of judging if the OLT has received all of the upstream packet signals from the n-th ONU 2 to which the OLT 1 gave transmission permission, when the limit time measured by the timer 2 for controlling transmission permission time started in step 5 (S5) has not expired. When the OLT 1 has not received all of the upstream packet signals from the n-th ONU 2, the OLT 1 always monitors a state of receiving the upstream packet signal by repeating step 6 (S6) of judging if the limit time measured by the timer 2 for controlling transmission permission time has expired and step 7 (S7) of judging if receipt of the upstream packet signal has ended.

S8

S8 is a step of stopping the timer 2 for controlling transmission permission time when the OLT has received all of the upstream packet signals transmitted from the n-th ONU 2 to which the OLT 1 gave transmission permission.

S9

As stated above, S9 is a step of updating the identifier (ONU_ID) of the ONU 2 to which the OLT 1 gives transmission permission.

Next, with reference to FIG. 6, allocation algorithm in each of the above steps for setting transmission permission to the plurality of ONUs 2 by the OLT 1 according to this invention is explained.

The OLT 1 sets the identifier (ONU_ID) for specifying the ONU 2 in the transmission permission information 55 area in the downstream OAM packet for the n-th ONU 2 among the plurality of ONUs 2 registered in advance (S1). Then, the OLT 1 starts the timer 1 for detecting packet (S2), which is the first timer 1, in consequence of step 1 (S1) for setting the identifier (ONU_ID) for specifying the ONU 2 in the transmission permission information 55 area in the downstream OAM packet. As a timer value in this first timer, time corresponding to a total value of transmission line loops delay between the OLT 1 and the ONU 2 in the PON and processing time in each of circuits of the OLT 1 and the ONU 2 can be set arbitrarily. Here, this total value includes latency time until the OLT 1 actually sends a frame including the identifier (ONU_ID) as the downstream frame signal, transmission delay time in the transmission line when the downstream frame signal is transmitted to the ONU 2, processing delay time until the ONU 2 detects transmission permission directed to the ONU 2 itself after the ONU 2 has received the downstream frame signal, processing delay time until the ONU 2 sends the upstream packet signal after the ONU 2 detects transmission permission, transmission delay time in the transmission line when the upstream packet signal is transmitted to the OLT 1, and processing time necessary for the OLT 1 to detect the upstream packet signal from the ONU 2 to which the OLT 1 has given transmission permission by the signal detecting circuit. The time set in this timer 1 for detecting packet can be same time for the plurality of ONUs 2, or different time for each of the ONUs 2.

The n-th ONU 2 detects the identifier (ONU_ID) in the transmission permission information 55 area in the downstream OAM packet, compares the identifier with the identifier held by the n-th ONU 2 itself and detects that the identifiers are identical, so that the n-th ONU 2 recognizes that transmission permission has been given and sends the upstream packet signal. The OLT 1 judges if the OLT 1 receives the upstream packet signal from the n-th ONU 2 to which the OLT 1 has given transmission permission before the first timer expires by using the packet identification information 74 in the upstream packet signal (S3). When the OLT 1 detects that this first timer has expired before the OLT 1 receives the upstream packet signal from the n-th ONU 2 to which the OLT 1 has given transmission permission (S4), an identification number of the ONU 2 to which the OLT 1 gives transmission permission is changed from the n-th ONU 2 to the n+1-th ONU 2 (S9). When the OLT 1 has received the upstream packet signal sent by the ONU 2 to which transmission permission is set before this first timer expires, the OLT 1 continues to give transmission permission, and in consequence of this, the OLT 1 stops the first timer 1 and at the same time, starts the second timer for controlling transmission permission time (S5). This second timer for controlling transmission permission time limits transmission permission time for each ONU 2 in order for assuring each of ONUs 2 of the upstream band, corresponding to the number of ONUs 2 registered in the OLT 1 and service content of the ONUs 2. This timer value can be set by the OLT 1 arbitrarily. While the OLT 1 is receiving the upstream packet signal transmitted from the ONU 2 to which transmission permission is set, the OLT 1 monitors expiration of the second timer for controlling transmission permission time (S6) and expiration of receipt of the upstream packet signal sent by the ONU 2 (S7). When the OLT 1 detects that the limit time measured by the second timer has expired before the OLT 1 finishes receiving the packet signal from the ONU 2 to which transmission permission is set, the OLT 1 judges that maximum time allocated to one ONU 2 is exceeded, and changes the identification number of the ONU 2 to which the OLT 1 gives transmission permission from the n-th ONU 2 to the n+1-th ONU 2 in order to forcibly stop setting of transmission permission for the n-th ONU 2 (S9). When it is detected that the OLT 1 has received all of the upstream packet signals from the ONU 2 to which the OLT 1 gave transmission permission, the second timer is stopped (S8), and the identification number of the ONU 2 to which the OLT 1 gives transmission permission is changed from the n-th ONU 2 to the n+1-th ONU 2 (S9).

Further, as stated above, in order for updating the ONU identifier (ONU_ID) in step 9 (S9) to permit another ONU 2 to transmit, it is not necessarily needed to change the number of the ONU 2 from the n-th ONU 2 to the n+1-th ONU 2, and any method can be adopted as far as the identification number can be updated.

According to this embodiment, the OLT 1 displays the identifier (ONU_ID) for specifying the ONU 2 to which the OLT 1 gives transmission permission in the transmission permission information 55 area in the downstream OAM packet for the plurality of ONUs 2 registered in advance, and allocates transmission permission of the packet on the upstream transmission line to the specific ONU 2 based on this display. Then, with updating of this identifier, the PON system can be configured, which treats the signal for sequentially allocating transmission permission of the packet on the upstream transmission line to the plurality of ONUs 2. Therefore, compared to the way that the OLT 1 allocates transmission permission to the ONU 2 after the OLT 1 receives transmission request transmitted from the ONU 2, and controls to avoid collision of the signals from the ONUs 2 to the OLT 1, as in the above-stated related technique, the OLT 1 can control allocation of transmission permission without a step of receiving transmission permission. Since the OLT 1 manages an access state of the plurality of ONUs 2 to the upstream transmission line collectively through this mechanism, a controlling procedure of sending and receiving by the OLT 1 and ONUs 2 can be simplified. Further, since the OLT 1 manages the access state of the plurality of ONU's to the upstream transmission line collectively, advantages of using the transmission line effectively and performing packet communication efficiently can be obtained.

Further, since the OLT 1 applies control algorithm for controlling two kinds of timers independently, advantages such as preventing a single ONU 2 from occupying transmission and providing opportunity of transmission of the packet for the plurality of ONUs 2 can be obtained.

Embodiment 2

Embodiment 2 is explained below.

This embodiment of the invention is characterized in that the upstream packet signal is reproduced accurately by using an area for displaying the overhead information 56 in the downstream OAM packet in a downstream packet signal 51 described in FIG. 4 and an overhead 72 area on the head of the upstream packet signal 71 described in FIG. 5.

Firstly, operations concerning the overhead information 56 in the OAM packet in the downstream packet signal in FIG. 4 and the overhead 72 attached to the head of the upstream packet signal in FIG. 5 are explained.

The optical receiving unit (particularly representing the O/E for converting the optical signal into the electrical signal in O/E•E/O in FIG. 1) in the OLT 1 firstly adjusts a gain of a receiver based on a difference in strength of the optical signal caused by a difference in a length of the optical fiber 4 from the OLT 1 to each of the ONUs 2, when the optical receiving unit receives the upstream packet signal from the ONU 2. After the gain becomes stable, the upstream packet signal is reproduced as the electrical signal. Here, the gain is a ratio of output to input of the optical receiver. In this case, a head part of the upstream packet signal is not reproduced or becomes an indefinite signal during a period until the gain of the optical receiver is stable. Therefore, the overhead 72 corresponding to the period until the gain of the optical receiver is stable is set on the head of the upstream packet signal. This overhead 72 is a group of signals of meaningless information.

The OLT 1 sets arbitrary header length information (overhead information 56) which is to be attached to the head of the upstream packet signal, in the downstream OAM packet, so that the OLT 1 enables the ONU 2 to send the upstream packet signal including arbitrary header length (overhead 72) corresponding to the overhead information 56 in an upstream transmission direction.

Therefore, it is not necessary that the packet analyzing unit analyzes the packet length signal described in the packet overhead (LLC part) in the first packet signal from the subscriber's equipment as in the related technique. Since the ONU 2 attaches the overhead 72 to the upstream packet signal, the OLT 1 reproduces a signal which is not required to be reproduced and stored in the overhead 72 area, until the gain of the optical receiver becomes stable. Then, the OLT 1 accurately reproduces the necessary upstream packets after the gain of the optical receiver becomes stable, therefore, it becomes possible to accurately reproduce the upstream packet signal transmitted from the ONU 2. Further, there is a case that receiving performance of the optical receiver in the OLT 1 differs in each OLT 1. Therefore, by displaying the overhead information 56 appropriate for the performance of the optical receiver in the OLT 1 in a downstream OAM packet signal arbitrarily, it becomes possible to send the upstream packet signal with an arbitrary header length (overhead 72) in the upstream transmission direction. Therefore, since length of the overhead 72 can be changed flexibly based on the receiving performance of the optical receiver of the OLT 1, there is an advantage of reproducing the upstream packet signal accurately.

Embodiment 3

Embodiment 3 is explained below.

Figure 7:
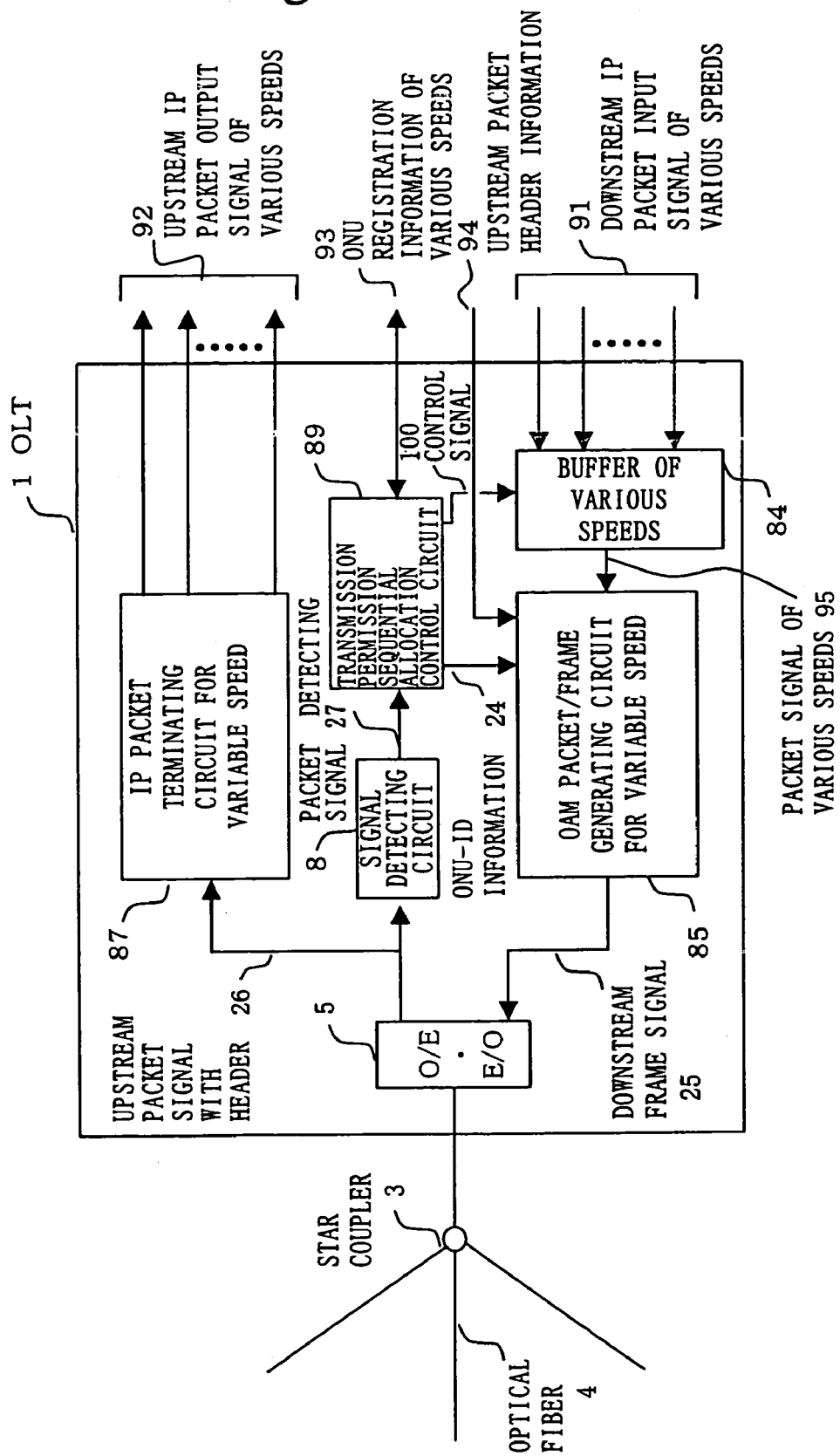
FIG. 7 is a functional configuration chart for explaining the PON system for the IP packet, including a function of switching speed related to Embodiment 3.

FIG. 7 is a functional configuration chart in the PON system for explaining an operation of a function of switching speed in this embodiment.

In the OLT 1, 84 denotes a buffer for various speeds for accumulating the IP packet signals (downstream packet signals) from interfaces for various speeds, separately according to signal transmission speeds, 85 denotes an OAM packet/frame generating circuit for generating the downstream frame signal including the OAM packet separately according to speeds, 5 denotes the O/E•E/O circuit for converting the electrical signal into the optical signal and the optical signal into the electrical signal, 87 denotes an IP packet terminating circuit for variable speed for terminating the upstream signal from the ONU 2 separately according to speeds, 8 denotes the signal detecting circuit for detecting receipt of the packet signal from the ONU 2, and 89 denotes a transmission permission sequential allocation control circuit for permitting the ONU 2 with the specific identifier to transmit the upstream packet signal by generating the downstream frame (downstream packet signal) for the ONUs 2 of various speeds time-divisionally and setting the identifier (ONU_ID) for specifying the ONU 2 in the transmission permission information 55 in the downstream OAM packet.

Figure 8:
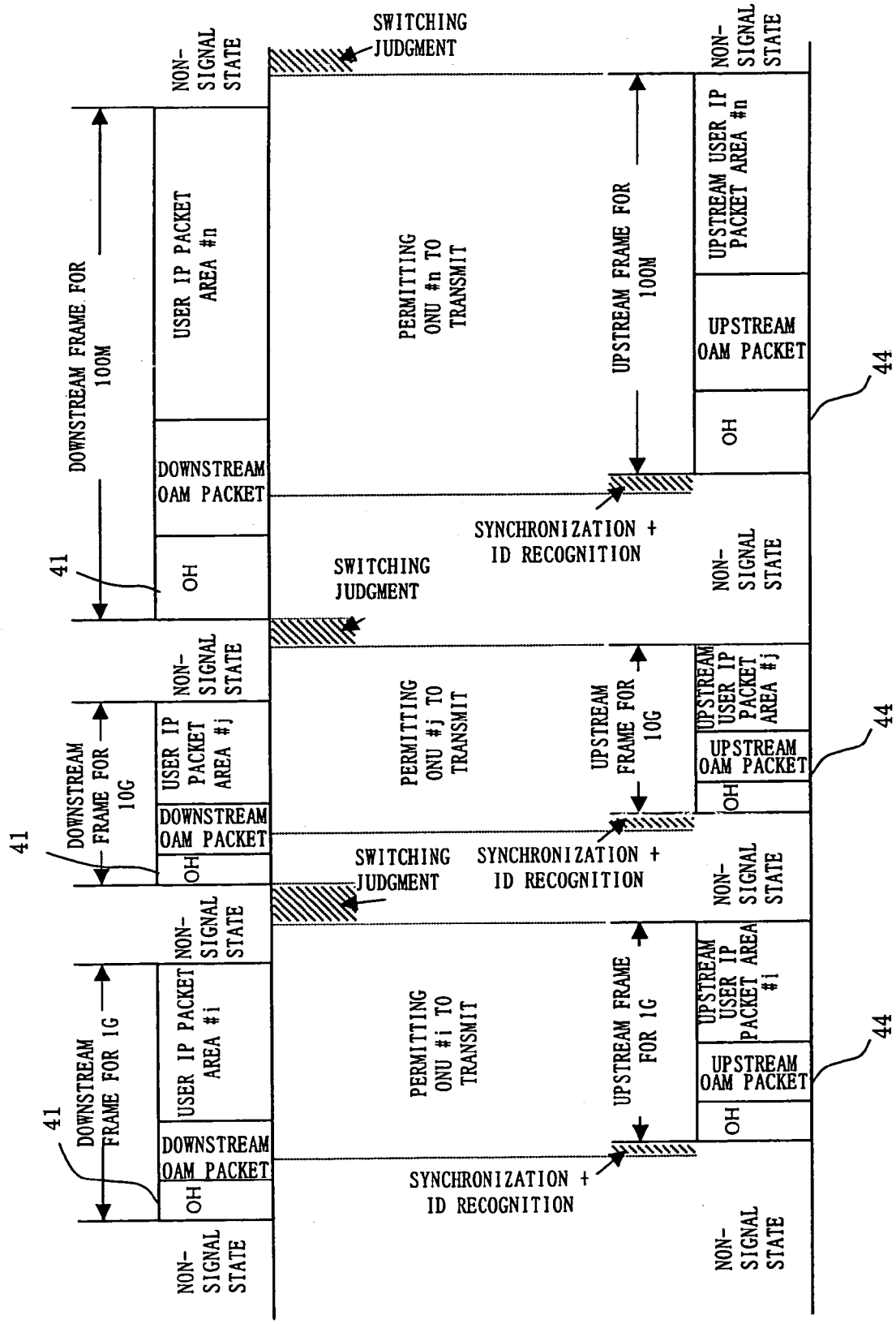
FIG. 8 is a configuration chart of the downstream frame and the upstream packet signal for explaining the PON system for the IP packet, including the function of switching speed related to Embodiment 3.

FIG. 8 is a configuration chart, for explaining this embodiment, of the downstream signal and the upstream signal in the PON system for the IP packet including the function of switching speed. The configuration chart of a downstream frame signal 41 illustrated in FIG. 8 shows an example of frame signal that is used when a plurality of the ONU 2 for 1 Gbps (BITE PER SECOND), the ONU 2 for 10 Gbps and the ONU 2 for 100 Mbps is connected to the same OLT 1. The upstream packet signal 44 illustrated in FIG. 8 is a configuration chart of the upstream packet signal corresponding to the downstream packet signal set separately according to signal transmission speeds among the downstream packet signals 41. Here, bps indicates a transmission speed in Ethernet when the Ethernet is provided for an UNI (USER NETWORK INTERFACE).

Next, with reference to FIG. 7 and FIG. 8, the operation of the function of switching speed is explained.

The OLT 1 reads out the IP packet signal of a specific signal transmission speed from the buffer 84 for various speeds, which accumulates the downstream packet signal separately according to signal transmission speeds. Then, the OLT 1 sets the identifier (ONU_ID) for specifying the ONU 2 in the transmission permission information 55 area in the OAM packet in the downstream packet signal, in order to give transmission permission to the ONU 2 of an arbitrary speed among the plurality of ONUs 2 registered separately according to speeds. After then, the OLT 1 transmits the downstream packet signal including the IP packet signal and the OAM packet signal which has the overhead information 56 to the ONU 2. In this case, only the ONU 2 which has been synchronized with the transmission speed of the OLT 1 can receive this downstream packet signal, and implement OAM packet termination process. The ONU 2 which has established synchronization with the downstream packet signal and implemented termination process for the OAM packet signal, detects the identifier (ONU_ID) in the transmission permission information 55 area in the OAM packet. After confirming identity, the ONU 2 transmits the upstream packet signal to the OLT 1. The above operation is repeated for each signal transmission speed. The configuration of the ONU 2 is identical with the configuration of the ONU 2 explained in embodiment 1. However, in this embodiment, the ONUs 2 of various signal transmission speeds can be mixed in the system. Further, when a plurality of ONUs 2 synchronized with the transmission speed of the OLT 1 is mixed in the system, it is possible to apply the allocation algorithm explained in embodiment 1, which is for setting transmission permission by the OLT 1 to the plurality of ONUs 2.

As stated, since the OLT 1 includes the buffer 84 for various speeds for accumulating the downstream packet signal separately according to signal transmission speeds, this embodiment has advantages that the configuration of the PON system in which the plurality of ONUs 2 of various signal transmission speeds is mixed is realized and that an operation, such as relocation of the network due to increase in transmission volume of the ONU 2 becomes unnecessary.

Embodiment 4

Embodiment 4 is explained below.

Figure 9:
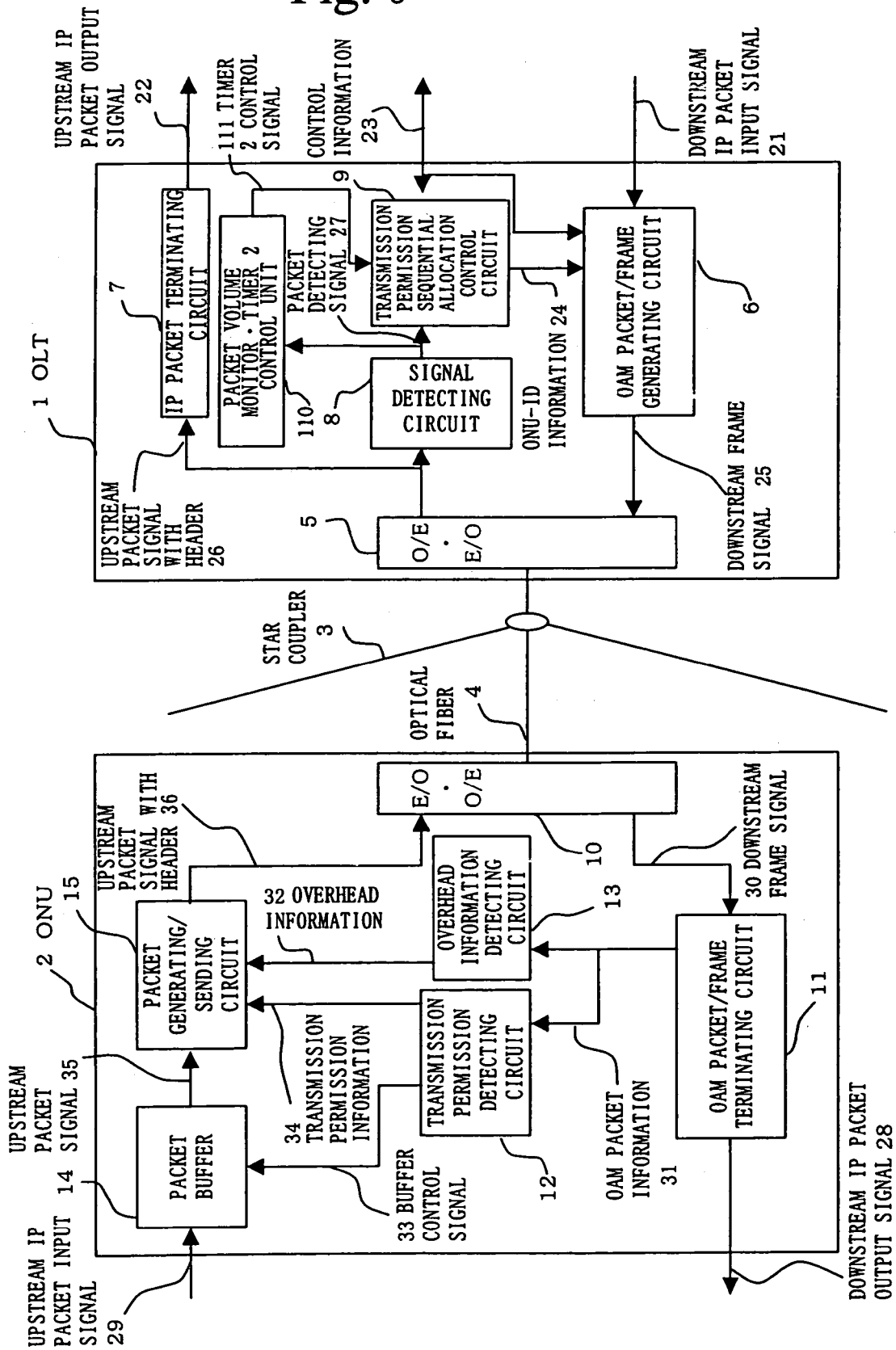
FIG. 9 is a functional configuration chart for explaining the PON system for the IP packet, including a function of controlling a timer 2 for controlling transmission permission time related to Embodiment 4.

FIG. 9 is a functional configuration chart of the PON system for explaining the function of controlling the timer 2 for controlling transmission permission time.

In the OLT 1, 110 denotes a packet volume monitor-timer 2 control unit which monitors packet communication volume in each of the ONUs 2 by receiving a packet detecting signal 27 and determines a value of the timer 2 for controlling transmission permission time dynamically, and 111 denotes the timer 2 control signal which notifies the transmission permission sequential allocation control circuit 9 of a value of the timer 2 for controlling transmission permission time.

Next, with reference to FIG. 9, a control operation on the timer 2 for controlling transmission permission time is explained.

The packet volume monitor-timer 2 control unit 110 monitors upstream packet communication volume of each of the ONUs 2. When the upstream packet communication volume is large, the packet volume monitor-timer 2 control unit 110 notifies the transmission permission sequential allocation control circuit 9 by the timer 2 control signal 111 to increase the value of the timer 2 for controlling transmission permission time which determines time for giving transmission permission to the relevant ONU 2. When the upstream packet communication volume is small, the packet volume monitor-timer 2 control unit 110 notifies the transmission permission sequential allocation control circuit 9 by the timer 2 control signal 111 to decrease the value of the timer 2 for controlling transmission permission time which determines time for giving transmission permission to the relevant ONU 2. As a method for judging if the upstream communication volume of each of the ONUs 2 is large or small by the packet volume monitor-timer 2 control unit 110, it is possible to judge based on the upstream packet communication volume in a certain period of time. It is also possible to judge based on the upstream packet communication volume in a period between time when transmission permission is given to the relevant ONU 2 at once and time when transmission permission is given to a next ONU 2.

As stated, the OLT 1 includes the packet volume monitor-timer 2 control unit 110 which monitors the upstream packet communication volume of each of the ONUs 2 and determines the value of the timer 2 for controlling transmission permission time for determining time for giving transmission permission to the relevant ONU 2 based on the upstream packet communication volume. Therefore, in this embodiment, it becomes possible to increase time for giving transmission permission to the ONU 2 which has large upstream packet communication volume and decrease time for giving transmission permission to the ONU 2 which has small upstream packet communication volume, and even when volume of generated upstream packet to be communicated differs in the ONUs, there is an advantage of communicating efficiently.

Embodiment 5

Embodiment 5 is explained below.

Figure 10:
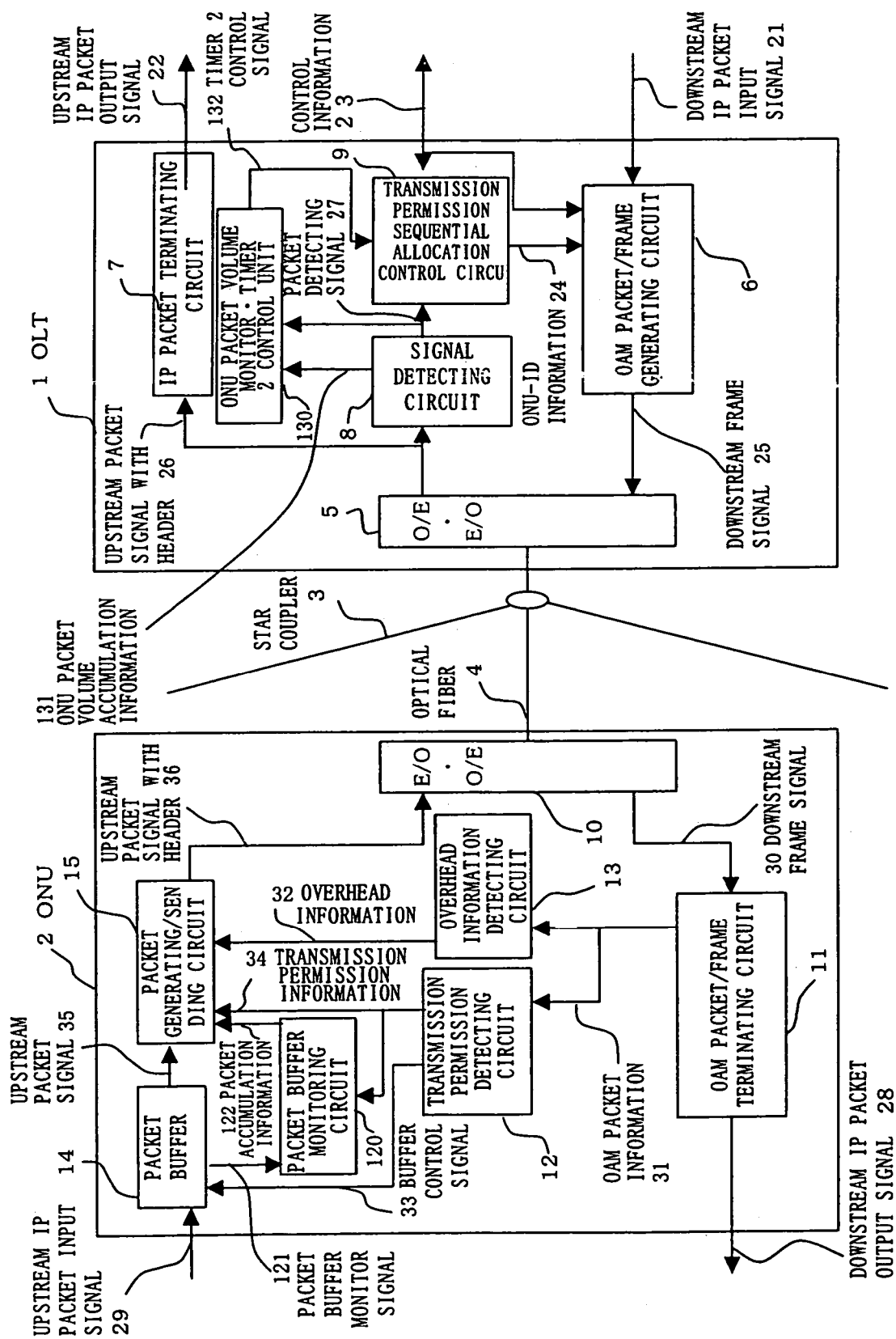
FIG. 10 is a functional configuration chart for explaining the PON system for the IP packet, including the function of controlling the timer 2 for controlling transmission permission time related to Embodiment 5.

FIG. 10 shows a functional configuration chart of the PON system for explaining the function of controlling the timer 2 for controlling transmission permission time in this embodiment.

In the ONU 2, 120 denotes a packet buffer monitor circuit for monitoring packet accumulation volume in the packet buffer 14 and setting the packet accumulation volume in the upstream OAM packet, 121 denotes the packet buffer monitor signal for notifying the above packet buffer monitor circuit 120 of the packet accumulation volume, 122 denotes the packet accumulation information signal for setting the packet accumulation volume in the packet buffer 14 in the upstream OAM packet, 130 denotes an ONU packet volume monitor-timer 2 control unit for receiving the packet accumulation information in the ONU and determining the value of the timer 2 for controlling transmission permission time for the relevant ONU dynamically, 131 denotes the ONU packet accumulation information for notifying the ONU packet volume monitor-timer 2 control unit 130 of the packet accumulation information set in the upstream OAM packet, and 132 denotes the timer 2 control signal for notifying the transmission permission sequential allocation control circuit 9 of the value of the timer 2 for controlling transmission permission time.

Next, with reference to FIG. 10, the control operation on the timer 2 for controlling transmission permission time is explained.

The packet-buffer monitoring circuit 120 in the ONU 2 monitors the upstream packet volume accumulated in the packet-buffer 14, and when transmission permission is received from the OLT 1, the packet-buffer monitoring circuit 120 sets the upstream packet volume as the packet accumulation information in the message area 75 in the upstream OAM packet 71 and sends the upstream OAM packet to the OLT 1.

The ONU packet volume monitor-timer 2 control unit 130 in the OLT 1 receives the ONU packet accumulation information 131 set in the message-area 75 as the packet accumulation information in the above upstream OAM packet 71, and when the packet accumulation volume in the relevant ONU 2 is large, the ONU packet volume monitor-timer 2 control unit 130 notifies the transmission permission sequential allocation control circuit 9 to increase the value of the timer 2 for controlling transmission permission time which determines time for giving transmission permission to the relevant ONU 2 by using the timer 2 control signal 111. When the upstream packet accumulation volume is small, the ONU packet volume monitor-timer 2 control unit 130 notifies the transmission permission sequential allocation control circuit 9 to decrease the value of the timer 2 for controlling transmission permission time which determines time for giving transmission permission to the relevant ONU 2 by using the timer 2 control signal 111.

As stated, since the ONU 2 to which the OLT 1 has given transmission permission has the packet buffer monitoring circuit for monitoring the upstream packet accumulation volume in the packet buffer and notifying the OLT 1 of the accumulated packet volume when the relevant ONU 2 receives transmission permission, and the OLT 1 has the ONU packet volume monitor-timer 2 control unit 130 for receiving the packet accumulation information in the above ONU 2 and determining the value of the timer 2 for controlling transmission permission time which determines time for giving transmission permission to the relevant ONU 2 based on the accumulation volume, in this embodiment, it become possible to increase time for giving transmission permission to the ONU 2 which has large upstream packet accumulation volume and decrease time for giving transmission permission to the ONU 2 which has small upstream packet accumulation volume. Therefore, there is an advantage of communicating efficiently even when volume of the generated upstream packet to be communicated differs in the ONUs Embodiment 6

Embodiment 6 is explained below.

Figure 11:
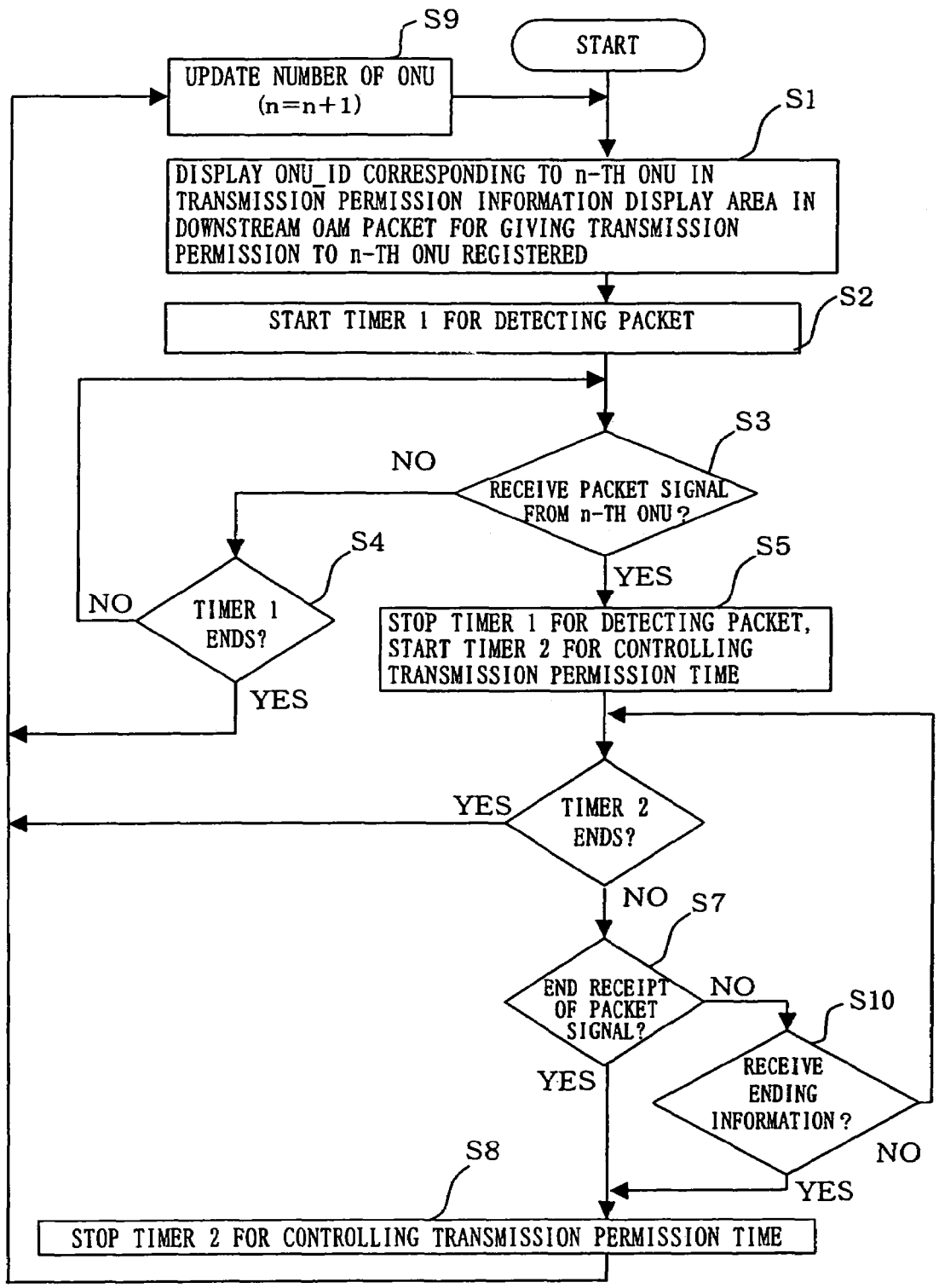
FIG. 11 is a functional configuration chart for explaining the PON system for the IP packet, including a function of transmitting packet absence notification related to Embodiment 6.
Figure 12:
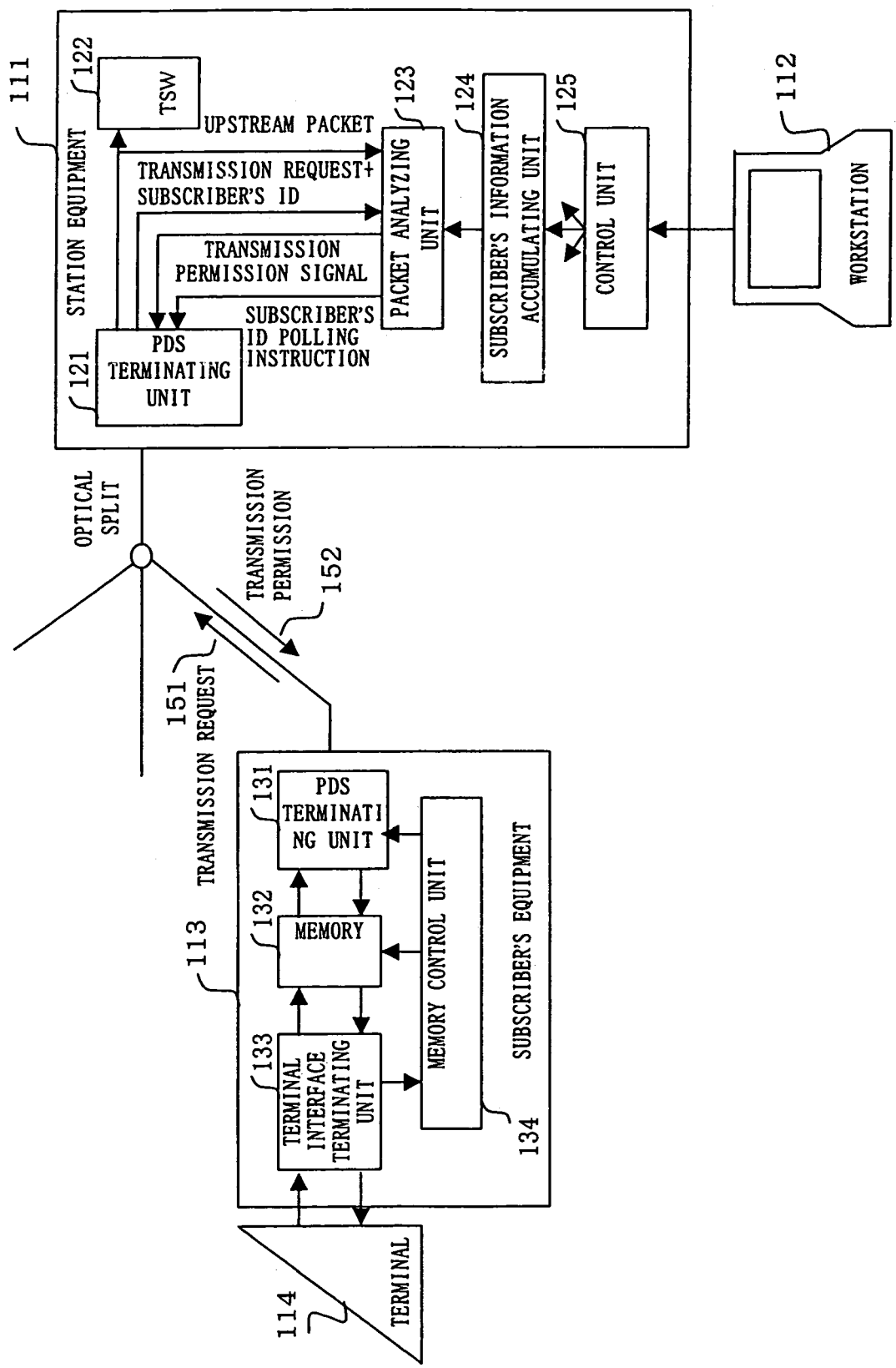
FIG. 12 is a system configuration chart in related optical communication.

FIG. 11 is a flow chart concerning allocation algorithm for setting transmission permission to the plurality of ONUs 2 by the OLT 1 in this embodiment.

In FIG. 11, step 10 (S10) stated below is added to the flow chart illustrated in FIG. 6. Since steps other than step 10 (S10) are stated earlier, explanation is omitted.

S10

S10 is a step of judging if the OLT 1 has received ending information indicating that transmission of the upstream user IP packet from the ONU 2 has ended. When the OLT 1 has received the ending information from the ONU 2, processing goes to step 8 (S8) and the OLT 1 stops the timer 2 for controlling transmission permission time. When the OLT 1 has not received the ending information from the ONU 2, processing goes back to step 6 (S6), and the OLT 1 judges if the timer 2 for controlling transmission permission time has expired.

Next, with reference to FIG. 11, packet receipt ending judgment control based on receipt of the ending information from the ONU 2 is explained.

If the ONU 2 in this embodiment does not have the upstream user IP packet to be transmitted when the OLT 1 has given transmission permission to the ONU 2, the ONU 2 notifies the OLT 1 of the ending information in the message area 75 in the upstream OAM packet 49, which informs that there is no upstream user IP packet. Further, while the OLT 1 is giving transmission permission and the upstream user IP packet is being transmitted, when there is no upstream user IP packet to be transmitted next, the ONU 2 notifies the OLT 1 of the ending information in the message area 75 in the upstream OAM packet 49, which informs that there is no upstream user IP packet.

In the allocation algorithm for setting transmission permission to the plurality of ONUs 2 in FIG. 11, the OLT 1 judges if the OLT 1 has received the ending information from the ONU 2 in step 10 (S10). If the OLT 1 has received the ending information, the OLT 1 stops the timer 2 for controlling transmission permission time in step 8 (S8), and updates the identifier (ONU_ID) of the ONU 2 to which the OLT 1 gives transmission permission from step 9 (S9) on. When the OLT 1 has not received the ending information from the ONU 2, the processing goes back to step 6 (S6). Then, the OLT judges if the timer 2 for controlling transmission permission time has expired and continues to receive the upstream user IP packet 79.

As stated, the ONU 2 includes a function of informing the OLT 1 by using the message area 75 in the upstream OAM packet as the ending information when there is no upstream user IP packet to be sent, and the OLT includes a function of judging if upstream user IP packet transmission has ended by receiving the ending information from the ONU 2. Therefore, it becomes possible to give transmission permission to a next ONU 2 without waiting until the timer 2 for controlling transmission permission time expires. Hence, there is an advantage of reducing useless latency time and allocating transmission permission efficiently.

Embodiment 7

Embodiment 7 is explained below.

The OLT 1 in this embodiment specifies volume (value of time or data volume) of the packet which an ONU 2 can send continuously in the message area 57 in the downstream OAM packet when the OLT 1 gives transmission permission to the ONU 2. The ONU 2 receives transmission permission and the specified volume of the packet which can be sent continuously, and the ONU 2 stops an operation of sending the packet when packet transmission in a specified range has ended even if there is still the upstream packet to be sent.

As stated, the OLT 1 includes a function of specifying the volume of the packet which the ONU 2 can send continuously and determining the value of the timer 2 for controlling transmission permission time based on this specified volume when the OLT 1 gives transmission permission to the ONU 2, and the ONU 2 includes a function of stopping the operation of sending the packet when transmission of the packet in the specified range ends in a case that the OLT 1 has given transmission permission and specified the volume of the packet which can be sent continuously. Accordingly, the ONU 2 can stop transmission of the packet without being forced to stop by the expiration of the timer 2 for controlling transmission permission time, and there is an advantage of allocating transmission right to the plurality of ONUs efficiently.

So far, in all of the embodiments, explanation was made on the PON system. However, it is not necessary to limit this invention to the PON system, and this invention can be used in a transmission method for packet communication. Therefore, concerning the transmission line, it is not necessary to limit the transmission line to the optical fiber, and as far as packet communication can be performed, an exclusive line, etc. can be used.

Further, in all of the embodiments, an embodiment of sending and receiving between the master station (OLT) and the slave station (ONU) has been illustrated. However, this system is not limited to the communication system including the master station and the slave station, and this system can be applied to the communication system in general including a transmitter and a receiver.

Terms of "accumulate" and "display" which are described so far mean storing in a recoding medium.

Further, in all of the embodiments, each of operations in each of elements are mutually related, and the operation in each of the elements can be replaced with a series of operations in considering relationship among the operations illustrated above. By replacing in this way, it is possible to realize embodiments of invention of the method. Further, by replacing the operation in each of the above elements with processing in each of the elements, it is possible to realize embodiments of a program and embodiments of a computer-readable recording medium in which the program is stored. These embodiments can be configured by a program which can be fully operated in the computer. Each of processing in the embodiments of the program and the embodiments of the computer-readable recording medium in which the program is stored is executed by the program. However, this program is stored in a recording unit, and read from the recording unit to a central processing unit (CPU), and each of the flow charts are executed by the central processing unit. The recording unit and the central processing unit are not illustrated.

Further, software and the program in each of the embodiments can be also realized as firmware stored in ROM (READ ONLY MEMORY). Or, it is also possible to realize each of functions in the aforementioned program by combining the software, the firmware and hardware.

INDUSTRIAL APPLICABILITY

According to this invention, since the OLT allocates transmission permission of the packet on the upstream transmission line to the plurality of ONUs registered without receiving transmission request, it is possible to simplify sending and receiving.

Further, the ONU can transmit the upstream packet signal based on transmission permission information of the OLT.

Further, it is possible to limit time of receiving the upstream packet signal transmitted from the ONU to which transmission permission has been given, by timer control of the timer 1 for detecting packet.

Further, it is possible to limit time of ending receipt of the upstream packet signal transmitted from the ONU to which transmission permission has been given, by timer control of the timer 2 for permitting transmission Further, it becomes possible to reproduce the upstream packet signal accurately by setting the overhead in the length appropriate for the performance of the optical receiver of the OLT.

Further, it is possible to mix the plurality of ONUs of various signal transmission speeds in a same system by providing a buffer for various signal transmission speeds in the OLT.

Further, it is possible to change the value of the timer 2 for controlling transmission permission time by providing a function of monitoring packet volume in the OLT, and even when the volume of the generated upstream packet to be communicated differs in the ONUs, it is possible to communicate efficiently.

Further, by providing the packet accumulation volume monitor for the packet buffer and a function of notifying the OLT in the ONT and by providing a function of receiving the packet accumulation information in the OLT, it is possible to change the value of the timer 2 for controlling transmission permission time. Even when the generated volume of the upstream packet to be communicated differs in the ONUs, it is possible to communicate efficiently.

Further, since the function of notifying the OLT of the ending information of transmission is provided in the ONU and a function of permitting a next ONU to transmit by receiving the ending information is provided in the OLT, it becomes possible to give transmission permission to the next ONU without waiting until the timer 2 for controlling transmission permission time expires. It is possible to allocate the transmission right efficiently.

Further, since a function of specifying the volume of the packet which can be transmitted continuously when the OLT gives transmission permission to the ONU is provided in the OLT and a function of stopping the operation of sending the packet when transmission reaches the volume of the packet which can be transmitted continuously specified at time of permitting transmission is provided in the ONU, the ONU can stop transmitting without being forced to stop by the expiration of the timer 2 for controlling transmission permission time. The OLT can give transmission permission to the next ONU, and the transmission right can be allocated efficiently among the plurality of ONUs.

Further, by a method of sequentially allocating transmission permission of the packet on the upstream transmission line from the OLT to the plurality of ONUs registered, there is an advantage of simplifying sending and receiving in the packet communication.

Further, by the program for sequentially allocating transmission permission of the packet on the upstream transmission line from the OLT to the plurality of ONUs registered, processing of packet communication in a simplified sending and receiving method can be executed on the computer.

Further, the OLT uses a computer-readable recording medium which records the program for sequentially allocating transmission permission of the packet on the upstream transmission line to the plurality of ONUs registered as a medium, and the OLT can execute the above processing of packet communication on the computer by the program read by the computer from the above recording medium.

The invention claimed is:

1. A packet communication system, comprising:
a master station configured to transmit a downstream packet signal including identification information for identifying transmission permission without receiving a transmission request; and
a slave station configured to receive the downstream packet signal transmitted from the master station and judge if transmission is permitted based on the identification information in the received downstream packet signal, wherein
the slave station is configured to transmit an upstream packet signal to the master station when the slave station judges that transmission is permitted,
the master station includes a first timer configured to measure a limit time when the master station can judge if the upstream packet signal has been transmitted from the slave station to which transmission is permitted,
the master station is configured to judge if the upstream packet signal transmitted from the slave station is received within the limit time measured by the first timer, stops the first timer when the master station has received the upstream packet signal, and updates the identification information for identifying transmission permission when the master station has not received the upstream packet signal,
the master station includes a second timer configured to measure limit time when the master station can continuously receive the upstream packet signal transmitted from the slave station to which transmission has been permitted, and
the master station judges if receipt of the upstream packet signal transmitted from the slave station has ended within the limit time measured by the second timer, stops the second timer when the receipt has ended, and updates the identification information for identifying transmission permission when the receipt has not ended.

2. The packet communication system of claim 1,
wherein the master station monitors upstream packet communication volume of each slave station and controls a value of the second timer based on the upstream packet communication volume.

3. The packet communication system of claim 1,
wherein the slave station informs the master station of volume of the upstream packet signal to be accumulated in the buffer when transmission permission is given to the slave station, and
wherein the master station controls a value of the second timer based on upstream packet accumulation volume informed by the slave station.

4. The packet communication system of claim 1,
wherein the slave station informs the master station of ending information indicating that no upstream packet signal is to be transmitted when no upstream packet signal is accumulated in the buffer when transmission permission is given to the slave station, and
wherein the master station receives the ending information informed by the slave station and gives transmission permission to a next slave station after the slave station without waiting until the second timer expires.

5. The packet communication system of claim 1,
wherein when transmission permission is given to the slave station and the slave station has ended transmission of the upstream packet signals accumulated in the buffer to the master station, the slave station informs the master station of ending information indicating that there is no upstream packet signal to be transmitted, and
wherein the master station receives the ending information informed by the slave station and gives transmission permission to a next slave station after the slave station without waiting until the second timer expires.

6. The packet communication system of claim 1,
wherein the master station specifies a packet volume which can be transmitted continuously by the slave station when the master station gives transmission permission to the slave station,
wherein the slave station ends processing of packet transmission based on the specified packet volume which can be transmitted continuously.

7. A packet communication system, comprising:
a master station configured to transmit a downstream packet signal including identification information for identifying transmission permission without receiving a transmission request; and
a slave station configured to receive the downstream packet signal transmitted from the master station and judge if transmission is permitted based on the identification information in the received downstream packet signal, wherein
the slave station is configured to transmit an upstream packet signal to the master station when the slave station judges that transmission is permitted,
the master station transmits a downstream packet signal including overhead information indicating time when output of the upstream packet signal is unstable, and
the slave station adds an overhead which is a group of signals not reproduced by the master station on a head of the upstream packet signal corresponding to the overhead information in the downstream packet signal transmitted from the master station.

8. A packet communication system, comprising:
a master station configured to transmit a downstream packet signal including identification information for identifying transmission permission without receiving a transmission request; and
a slave station configured to receive the downstream packet signal transmitted from the master station and judge if transmission is permitted based on the identification information in the received downstream packet signal, wherein
the master station includes a buffer configured to accumulate the downstream packet signal separately according to signal transmission speeds, and
the master station reads out the downstream packet signal of various speeds accumulated in the buffer separately according to the signal transmission speeds, transmits the downstream packet signal of the various speeds read out, and permits a slave station which has been able to be synchronized with transmission speed of the downstream packet signal to transmit an upstream packet signal.

9. A packet communication method, comprising:
transmitting, from a master station, a downstream packet signal including identification information for identifying transmission permission without receiving a transmission request;
receiving at a slave station the downstream packet signal transmitted from the master station;
judging, at the slave station, if transmission is permitted based on an identification number of the received downstream packet signal;
transmitting, from the slave station, an upstream packet signal to the master station when the slave station judges that transmission is permitted;
measuring, at a first timer at the master station, a limit time when the master station can judge if the upstream packet signal has been transmitted from the slave station to which transmission is permitted;
judging, by the master station, if the upstream packet signal transmitted from the slave station is received within the limit time measured by the first timer;
stopping the first timer when the master station has received the upstream packet signal;
updating the identification information for identifying transmission permission when the master station has not received the upstream packet signal;
measuring, at a second timer at the master station, a limit time when the master station can continuously receive the upstream packet signal transmitted from the slave station to which transmission has been permitted;
judging, at the master station, if receipt of the upstream packet signal transmitted from the slave station has ended within the limit time measured by the second timer;
stopping the second timer when the receipt has ended; and
updating the identification information for identifying transmission permission when the receipt has not ended.

10. A computer-readable recording medium for recording a packet communication program for making a computer execute processing comprising:
transmitting, from a master station downstream packet signal including identification information identifying transmission permission without receiving a transmission request;
receiving at a slave station the downstream packet signal transmitted from the master station;
judging, at the slave station, if transmission is permitted based on an identification number of the received downstream packet signal;
transmitting, from the slave station, an upstream packet signal to the master station when the slave station judges that transmission is permitted;
measuring, at a first timer at the master station, a limit time when the master station can judge if the upstream packet signal has been transmitted from the slave station to which transmission is permitted;
judging, by the master station, if the upstream packet signal transmitted from the slave station is received within the limit time measured by the first timer;
stopping the first timer when the master station has received the upstream packet signal;
updating the identification information for identifying transmission permission when the master station has not received the upstream packet signal;
measuring, at a second timer at the master station, a limit time when the master station can continuously receive the upstream packet signal transmitted from the slave station to which transmission has been permitted;
judging, at the master station, if receipt of the upstream packet signal transmitted from the slave station has ended within the limit time measured by the second timer;
stopping the second timer when the receipt has ended; and
updating the identification information for identifying transmission permission when the receipt has not ended.

* * * * *